United States Patent
Nekrashevych et al.

(10) Patent No.: US 10,129,084 B1
(45) Date of Patent: Nov. 13, 2018

(54) CENTRALIZED PARAMETER MANAGEMENT SYSTEM

(71) Applicant: CALLFIRE, INC., Santa Monica, CA (US)

(72) Inventors: Ievgen Mikhailovych Nekrashevych, Kiev (UA); Michael Epstein, Los Angeles, CA (US)

(73) Assignee: CALLFIRE, INC., Santa Monica, CA (US)

( * ) Notice: Subject to any disclaimer, the term of this patent is extended or adjusted under 35 U.S.C. 154(b) by 0 days.

(21) Appl. No.: 15/974,583

(22) Filed: May 8, 2018

Related U.S. Application Data (60) Provisional application No. 62/546,961, filed on Aug. 17, 2017.

(51) Int. Cl.
  *G06F 15/177* (2006.01)
  *H04L 12/24* (2006.01)
  *H04L 12/26* (2006.01)

(52) U.S. Cl.
  CPC ........ *H04L 41/082* (2013.01); *H04L 41/0213* (2013.01); *H04L 41/0823* (2013.01); *H04L 43/08* (2013.01); *H04L 41/0893* (2013.01)

(58) Field of Classification Search
  CPC ... H04L 41/082; H04L 41/0213; H04L 43/08; H04L 41/0823; H04L 41/0893
  See application file for complete search history.

(56) References Cited

U.S. PATENT DOCUMENTS

| | | | |
|---|---|---|---|
| 2004/0009767 A1* | 1/2004 | Lee | H04L 1/0025 455/422.1 |
| 2014/0195668 A1* | 7/2014 | Selvakumar | H04L 43/0817 709/224 |
| 2015/0248284 A1* | 9/2015 | Poiesz | G06F 8/65 717/168 |

* cited by examiner

*Primary Examiner* — Brian Whipple
(74) *Attorney, Agent, or Firm* — Knobbe, Martens, Olson & Bear, LLP

(57) ABSTRACT

A centralized system manages application configuration parameters in a network computing environment. The system centralizes the storage and management of application configuration parameters, and dynamically updates the networked application servers when parameter values are changed at the centralized system. The application servers can subscribe to and receive parameter updates from the centralized system, determine whether the updates are applicable to configuration parameters being used by the application, and implement any such updates. In some embodiments, the centralized system determines which application servers are affected by a particular parameter update, and only transmits data regarding the parameter update to the affected application servers.

20 Claims, 6 Drawing Sheets

CENTRALIZED PARAMETER MANAGEMENT SYSTEM

CROSS-REFERENCE TO RELATED APPLICATION

The present application claims priority to U.S. Provisional Patent Application No. 62/546,961, filed on Aug. 17, 2017, which is incorporated by reference herein.

BACKGROUND

Computing devices may be used to execute applications in a network environment. For example, a server computing device may execute one or more applications that interact with other devices via a network, or that interact with data received from network-accessible data stores. During operation, the applications may access various configuration parameters that control or otherwise affect the operation of the applications in some way. For example, certain configuration parameters may be used to control the level of detail that an application includes in a log file during execution. The configuration parameters may be stored in a separate parameter file or they may otherwise be externally modifiable. In this way, the configuration parameters can be accessed and changed without requiring changes to be made directly to the application source code or logic. For example, when a change to the level of log detail is desired, a system administrator may change a parameter value in a configuration file or other data store. The next time the application begins execution, it can read the configuration file and implement the desired change.

BRIEF DESCRIPTION OF DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION OF ILLUSTRATIVE EMBODIMENTS

Introduction

The present disclosure is directed to a system that manages application configuration parameters in a network computing environment. In some network implementations, individual applications may be distributed across multiple servers (e.g., portions of an application may execute on physically separate computing devices), or multiple servers may individually execute separate applications (e.g., one or more servers may execute a first application, one or more other servers may execute the first application and/or a second application, etc.). The applications, although distributed across separate servers and potentially performing different functions, may nevertheless share certain configuration parameters. The system centralizes the storage and management of application configuration parameters, and dynamically updates networked application servers when parameter values are changed at the centralized system. The application servers can subscribe to and receive parameter value updates from the centralized system, determine whether the updates are applicable to configuration parameters being used by an application on the application server, and implement any such updates. In some embodiments, the centralized system determines which application servers are affected by a particular configuration parameter update, and then transmits data regarding the update to only the affected application servers.

Generally described, application configuration parameters (also referred to herein as "configuration parameters" or simply as "parameters" for convenience) are used to control or otherwise affect the operation of an application in some way. Illustratively, an application may include executable code with multiple logical branches of execution, and may determine which particular logical branch to execute based on the value of an application configuration parameter. For example, an application configuration parameter may be used to control the level of detail that an application includes in an application log during execution. If the value of the application configuration parameter is one particular value, then the application may include information in the log only for warnings and errors. If the value of the application configuration parameter is a different value, then the application may include information about each function executed regardless of whether a warning or error is generated. In some cases, execution of an application may be affected by an application configuration parameter value in other ways. For example, an application configuration parameter may be used to control the number of operations an application executes in a given period of time, to control the period of time that the application waits in between performing operations, to control which output to produce, to control where to send output, etc.

Some configuration parameter management systems store information regarding application configuration parameters in a centralized location, and individual application servers access the systems upon boot up, application startup, and/or at periodic intervals thereafter. However, such systems fail to notify application servers of updates in substantially real-time or in an otherwise dynamic manner. Thus, it may be difficult or impossible to implement a parameter value change that is to take effect immediately on multiple different servers.

Aspects of the present disclosure address, among other things, issues with management of application configuration parameters, such as those described above. More specifically, a centralized parameter management system can provide a centralized location to access, set, store, and distribute application configuration parameter values for applications distributed across multiple devices, and to dynamically manage the distribution and synchronization of application configuration parameter values among the multiple devices when the parameter values are changed at the centralized parameter management system. For example, the centralized parameter management system can receive a change to a value of a particular application configuration parameter, such as a parameter that controls the level of detail that an application includes in an application log during execution. When the value of this parameter is changed at the centralized parameter management system, the value can be broadcast to the application servers that subscribe to parameter value changes. The individual application servers can then apply the change to the parameter value as necessary. Therefore, the centralized parameter management system reduces the amount of overhead required to change a value of a particular parameter on multiple devices.

Additional aspects of the disclosure relate to the caching of application configuration parameter values at the application servers. Application configuration parameter values—and changes thereto—can be stored by individual application servers in a local configuration parameter cache. Then, when an application executing on the server requires determination of a particular application configuration parameter value, the application can access the local configuration parameter cache instead of requesting the parameter value from the centralized parameter management system. In some embodiments, when an application sever boots up or when an application thereon begins executing, the application server can contact the centralized parameter management system and obtain the current values of all configuration parameters or of some subset thereof (e.g., those applicable to the application executing on the server). Changes to individual configuration parameter values at the centralized parameter management system can be broadcast to the application servers, and the new values can be updated in the local configuration parameter caches. In this way, when an application requires determination of a particular configuration parameter value, the local configuration parameter cache will have the latest value that was broadcast by the centralized parameter management system.

Although aspects of some embodiments described in the disclosure will focus, for the purpose of illustration, on particular examples of applications and application configuration parameters, the examples are illustrative only and are not intended to be limiting. In some embodiments, the techniques described herein may be applied to additional or alternative applications, application configuration parameters, and the like. Various aspects of the disclosure will now be described with regard to certain examples and embodiments, which are intended to illustrate but not limit the disclosure.

Network-Based Application Execution Environment

Figure 1:
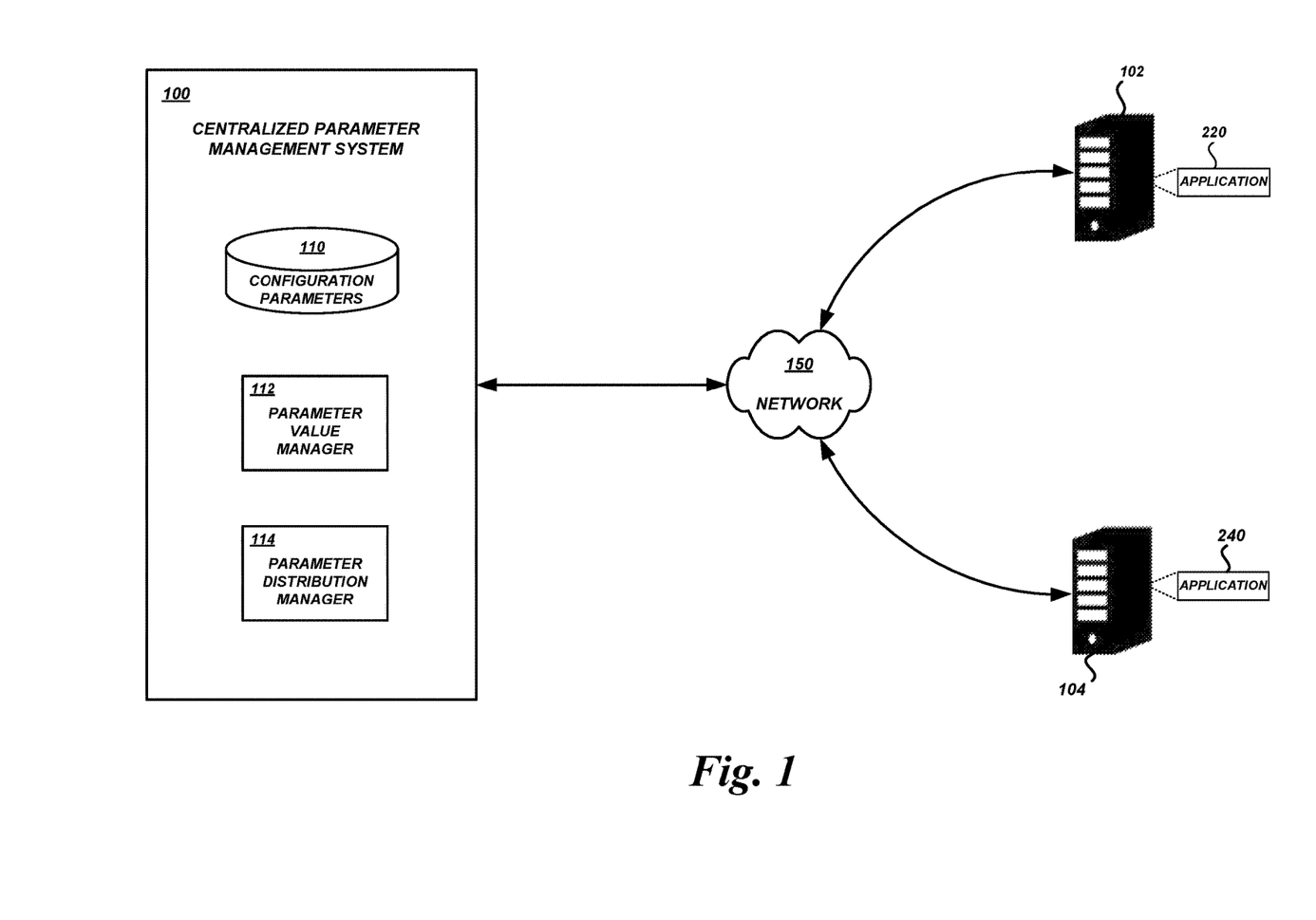
FIG. 1 is a block diagram of an illustrative computing environment including a centralized parameter management system and various application servers according to some embodiments.

With reference to an illustrative embodiment, FIG. 1 shows an example network environment in which aspects of the present disclosure may be implemented. As shown, the network environment may include a centralized parameter management system 100 and various application servers 102, 104. The centralized parameter management system 100 and the various application servers 102, 104 may communicate with each other via one or more communication networks 150.

In some embodiments, the communication network 150 (also referred to simply as a "network") may be a publicly-accessible network of linked networks, possibly operated by various distinct parties, such as the Internet. In some cases, the network 150 may include a private network, personal area network, local area network, wide area network, cable network, satellite network, cellular data network, etc., or a combination thereof, some or all of which may or may not have access to and/or from the Internet.

The centralized parameter management system 100 may include various components for providing the features described herein. Illustratively, the centralized parameter management system 100 may include a configuration parameters data store 110 for storing data regarding the application configuration parameter values that are transmitted to application servers, such as application servers 102, 104. The centralized parameter management system 100 may also include a parameter value manager 112 for managing the creation of configuration parameters, the updating of configuration parameter values in the configuration parameters data store 110, etc. The centralized parameter management system 100 may also include a parameter distribution manager 114 for transmitting the configuration parameter values and updates thereto to application servers, such as application servers 102, 104. The example components and data stores of the centralized parameter management system 100 shown in FIG. 1 are illustrative only, and are not intended to be limiting. In some embodiments, a centralized parameter management system 100 may have fewer, additional, and/or alternative components and data stores.

The centralized parameter management system 100 may be implemented on one or more physical server computing devices that provide computing services and resources to application servers 102, 104. In some embodiments, the centralized parameter management system 100 (or individual components thereof, such as the parameter value manager 112, parameter distribution manager 114, etc.) may be implemented on one or more host devices, such as blade servers, midrange computing devices, mainframe computers, desktop computers, or any other computing device configured to provide computing services and resources. For example, a single host device may execute one or more parameter value managers 112, parameter distribution managers 114, configuration parameter data stores 110, some combination thereof, etc. The centralized parameter management system 100 may include any number of such hosts.

In some embodiments, the features and services provided by the centralized parameter management system 100 may be implemented as web services consumable via one or more communication networks. In further embodiments, the centralized parameter management system 100 (or individual components thereof) is provided by one more virtual machines implemented in a hosted computing environment. The hosted computing environment may include one or more rapidly provisioned and released computing resources, such as computing devices, networking devices, and/or storage devices. A hosted computing environment may also be referred to as a "cloud" computing environment.

The individual application servers 102, 104 may execute applications, such as applications 220 and 240, respectively. An application 220 or 240 may be embodied at least partially in a set of programmatic instructions that execute desired functions or operations, sometimes referred to as "business logic." The applications are typically separate from the operating system of the application server on which they execute, and are therefore not manageable and/or configurable through standard network administration tools that manage network-level and operating-system level configuration. Rather, the applications are typically separate applications that execute within an operating system environment, and have their own set of executable code, data, configuration parameters, etc.

Illustratively, an application executing on an application server 102 or 104 may be any of a wide range of applications that implement desired business logic. For example, application 220 may be phone call initiation application that automatically initiates phone calls, and application 240 may be a web server application that serves web pages and other network content to computing devices. These example applications are illustrative only, and are not intended to be limiting. Although application servers 102, 104 are shown executing different applications than each other, in some embodiments the application servers 102 and 104 may execute the same application, different portions of the same distributed application (e.g., different modules or classes), etc. In some embodiments, any particular application server may execute multiple instances of a single application, multiple different applications or portions thereof, etc.

Figure 2:
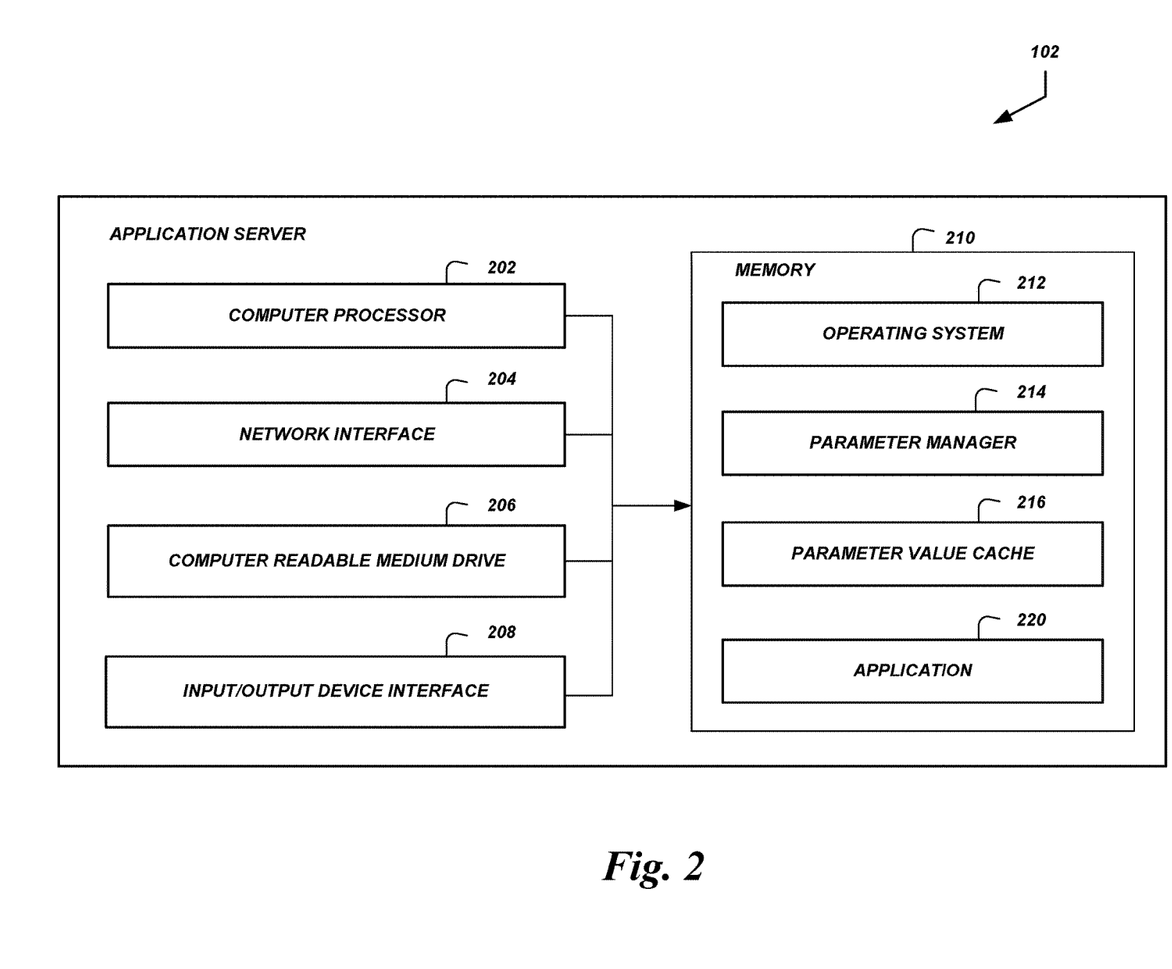
FIG. 2 is a block diagram of various components of an application server according to some embodiments.

FIG. 2 illustrates the various components of an example application server 102. In some embodiments, as shown, the application server 102 may include: one or more computer processors 202, such as physical central processing units ("CPUs"); one or more network interfaces 204, such as a network interface cards ("NICs"); one or more computer readable medium drives 206, such as a high density disk ("HDDs"), solid state drives ("SDDs"), flash drives, and/or other persistent non-transitory computer-readable media; an input/output device interface 208, such as an IO interface in communication with one or more microphones; and one or more computer readable memories 210, such as random access memory ("RAM") and/or other volatile non-transitory computer-readable media.

The computer readable memory 210 may include computer program instructions that the computer processor 202 executes in order to implement one or more embodiments. The computer readable memory 210 can store an operating system 212 that provides computer program instructions for use by the computer processor 202 in the general administration and operation of the application server 102. The computer readable memory 210 can further include computer program instructions and other information for implementing aspects of the present disclosure. For example, in one embodiment, the computer-readable memory 210 may include a parameter manager 214 that receives parameter values from the centralized parameter management system 100, stores them in a local data store, and/or provides them to the appropriate application. The computer-readable memory 210 may also include a parameter value cache 216 to store local copies of configuration parameter values received by the parameter manager 214. The computer-readable memory 210 may also include data and instructions for executing an application 220.

Example Configuration Parameter Management Process

Figure 3:
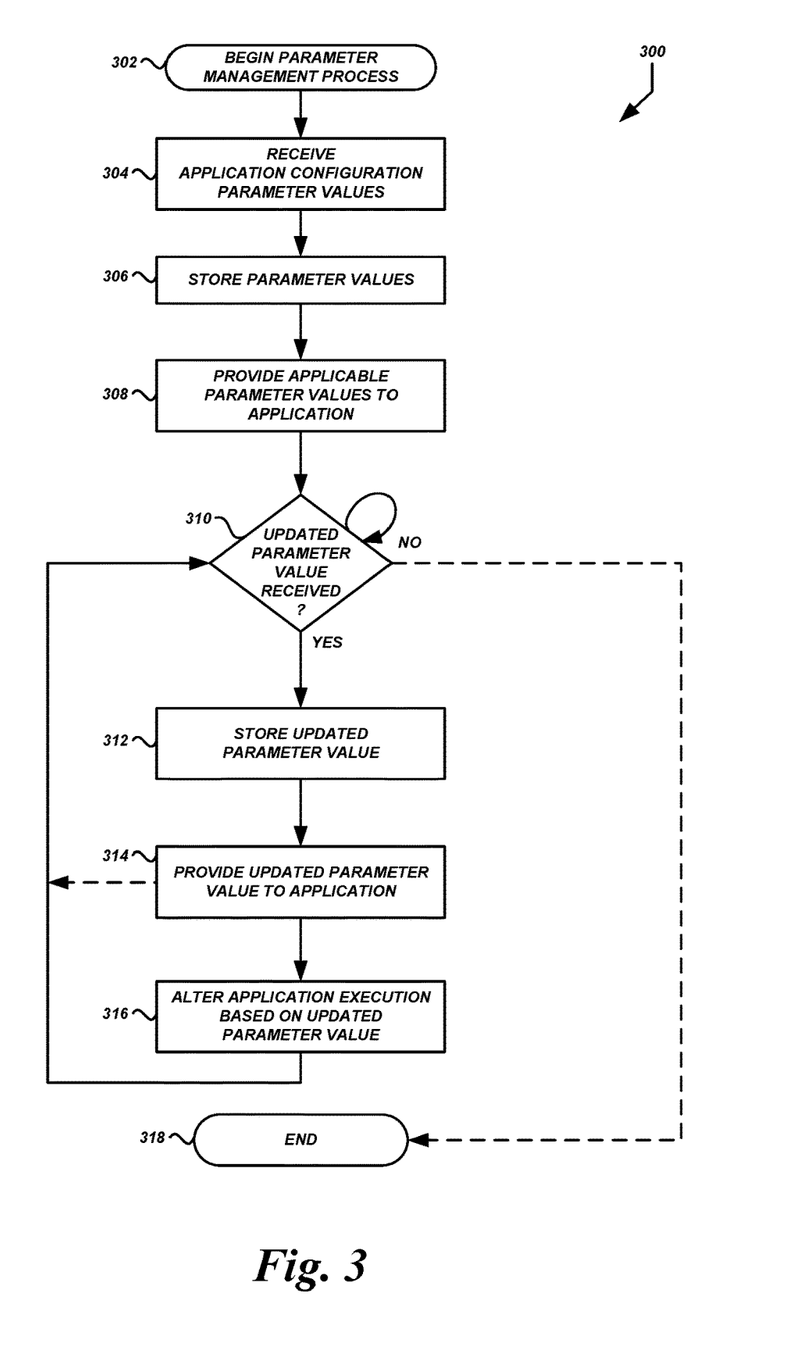
FIG. 3 is a flow diagram of an illustrative process for centralized parameter management according to some embodiments.

FIG. 3 is a flow diagram of an illustrative process 300 that may be executed by an application server to receive and manage configuration parameter values and updates thereto in connection with execution of an application. Portions of the process 300 will be described with reference to the example application server 102 shown in FIG. 2, and the example data flows and interactions shown in FIG. 4.

The process 300 shown in FIG. 3 begins at block 302. The process 300 may begin in response to an event, such as when the application server 102 boots up or connects to the centralized parameter management system 100. When the process 300 is initiated, a set of executable program instructions stored on one or more non-transitory computer-readable media (e.g., hard drive, flash memory, removable media, etc.) may be loaded into memory (e.g., random access memory or "RAM") of computing device. For example, the parameter manager 212 and/or application 220 may be loaded into memory 210 of the application server 102 and executed by the processor 202. In some embodiments, the process 300 or portions thereof may be implemented on multiple processors, serially or in parallel.

At block 304, the application server 102 can receive application configuration parameter values from the centralized parameter management system 100. Illustratively, the parameter manager 214 may connect to the centralized parameter management system 100 upon start-up of the application server 102, start-up of the parameter manager 214, start-up of the application 220, or in response to some other event. The parameter manager 214 can then request or automatically be provided with data regarding the current values of application configuration parameters managed by the centralized parameter management system 100. In some embodiments, the parameter manager 214 may obtain values for all application configuration parameters. For example, the centralized parameter management system 100 may not necessarily track which parameters are required by or otherwise being used by which application servers, and the application servers may not request specific subsets of parameters. In these embodiments, the processing that occurs at the centralized parameter management system 100 may therefore be streamlined. In some embodiments, the parameter manager 214 may obtain values for new configuration parameters, values for configuration parameters that have changed since the last time the parameter manager 214 communicated with the centralized parameter management system 100, and/or parameter values that are otherwise different than the values stored at the application server 102 (e.g., in the parameter value cache 216). For example, the centralized parameter management system 100 may track which parameters are required by or otherwise being used by which application servers, or the application servers may request subsets of the parameters managed by the centralized parameter management system 100. The centralized parameter management system 100 may therefore perform at least some filtering or otherwise determine which parameter values are to be sent to which application servers, thus reducing the volume of network traffic between the centralized parameter management system 100 and application servers.

In some embodiments, the configuration parameter values may be received in the form of key=value pairs. The key for a given configuration parameter may be the name or some other identifier of the configuration parameter, and the value is the current value of the configuration parameter. For example, "logger.className=WARN" is a key=value pair, with "logger.className" being the key, and "WARN" being the value. In this example, the key "logger.className" is a compound identifier in which "logger" refers to a particular application or component (e.g., the "logger" component), and "className" refers to a particular class whose logging configuration is controlled by the parameter. The value "WARN" may indicate that only warnings and errors occurring during execution of objects of the class "className" are to be logged, rather than general information. As another example, "dialer.callsPerSecond=10" is key=value pair in which the key includes a reference to the "dialer" class and "callsPerSecond" parameter. The value "10" indicates that the objects of the class "dialer" are to initiate 10 phone calls per second.

In some embodiments, keys may include or be associated with organizing data, such as data that places parameters within hierarchies or other organizational structures. For example, the centralized parameter management system 100 may manage multiple separate environments, such as a development environment in which new features are implemented for the first time, a test environment in which features are tested, and a production environment in which the actual business transactions for and with customers are processed. Each parameter key may be preceded by (or include as a prefix) a top-level environment identifier, such as "dev" for the development environment, "test" for the test environment, and "prod" for the production environment. Illustratively, there could be three separate instances of the "logger.className" parameter: one with a "dev.logger.className" key name, one with a "test.logger.className" key name, and one with a "prod.logger.className" key name. In this way, it is easier for applications to subscribe to only the parameters that apply the current operation of the application (e.g., only the "test.logger" parameters for an application in the test environment).

At block 306, the application server 102 can store the received parameter values so that they can be accessed by an application 220 executing on the application server 102. In some embodiments, the parameter manager 214 may store the received parameter values in the parameter value cache 216. The parameter value cache 216 may be a file, database, or other data storage object. For example, the parameter value cache 216 may be a sequential file or indexed file that includes key=value pairs for the configuration parameters. In some embodiments, the parameter values may be stored in RAM to provide faster retrieval than, e.g., hard disk. In this way, the centralized parameter management system 100 may provide faster performance than using a hard disk, even though fewer parameters may be stored in RAM than on hard disk. In some embodiments, the parameter manager 214 (or some other module or component of the application server 102) may not store the received parameter values in the parameter value cache 216, but may instead proceed directly to block 308 to provide parameter values to an application executing on the application server 102, such as application 220.

At block 308, the application server 102 can provide application configuration parameter values to the relevant applications or other components on the application server 102. In some embodiments, the parameter manager 214 can determine which parameters are for which applications based on the key of the parameter, and the corresponding classes of the application. For example, if the application 220 is a phone dialing application, then a parameter with the key "dialer.callsPerSecond" would be applicable, but a parameter with the key "webServer.timeout" would not be applicable. In this example, the parameter manager 214 can provide the "dialer.callsPerSecond" parameter value to the application 220, but not the "webServer.timeout" parameter.

In some embodiments, parameter management or filtering may be facilitated by parameter listeners that are configured to receive only parameters of a certain type or group of types, such as parameters with certain keys or portions of key names. Illustratively, the listeners may be associated with callback functions that are invoked in order to provide parameter value update (e.g., as arguments to the callback functions).

Parameter listeners may be registered with the parameter manager 214, and the parameter manger 214 can determine which listener or listeners, if any, are configured to receive individual parameter values provided by the centralized parameter management system 100. For example, the application 220 may register a first listener for parameters in the "dialer" group, and a second listener for parameters in the "logger" group. As another example, the application 220 may register a single listener that handles filtering of parameters (e.g., updates to parameters other than those in the "dialer" or "logger" groups are provided to the listener but are then suppressed by the listener to avoid being acted upon or received by the application 220). Illustratively, the parameter manager 214 may provide the application 220 with only parameters in the "logger" and "dialer" groups (e.g., parameters with a compound key name that includes "logger" or "dialer" at particular expected locations). In addition to these groups, additional organizational groupings (e.g., hierarchy levels) may be specified for a particular listener or group of listeners. For example, the application 220 may be in the production environment, and therefore the listeners may be used to receive values for parameters in the "prod.logger" and "prod.dialer" groups, but not for receiving values for parameters in the "test.logger" and "dev.dialer" groups, etc. The example listeners and parameter groupings are illustrative only, and are not intended to be exhaustive or limiting.

At decision block 310, the application server 102 can determine whether an update to an application configuration parameter has been received from the centralized parameter management system 100. If so, the process 300 can proceed to block 312. Otherwise, the process 300 may remain at decision block 310 until an update to a parameter is received, or until the process 300 is terminated at block 318 (e.g., by shutdown of the application server 102 or parameter manager 214).

At block 312, the application server 102 can store the received parameter value so that it can be accessed by the application 220 executing on the application server 102. In some embodiments, the parameter manager 214 may store the received parameter value in the parameter value cache 216.

At block 314, the application server 102 can provide the update to the application configuration parameter value to the relevant applications or other components on the application server 102. Returning to the example above, the application 220 may be a phone dialing application, and the parameter for which an updated value has been received may have a key=value pair of "dialer.callsPerSecond=20." In this example, the parameter manager 214 may provide the updated parameter value to the application 220, either directly or indirectly (e.g., via an application parameter listener). If the application were a web server application, then this parameter would not be applicable and would not be provided to the application, and the process 300 would return to decision block 310.

At block 316, the application 220 can apply the update to the configuration parameter. In the present example, the "dialer.callsPerSecond" parameter has been updated to a value of "20." In response to receiving this update, the application 220 can alter execution to implement this change. For example, the application 220 can begin making 20 calls per second instead of 10 calls per second. The change may be implemented immediately, or at some predetermined or dynamically determined time (e.g., after a delay, or after all calls currently queued have been made, etc.). The process 300 may then return to decision block 310.

Figure 4:
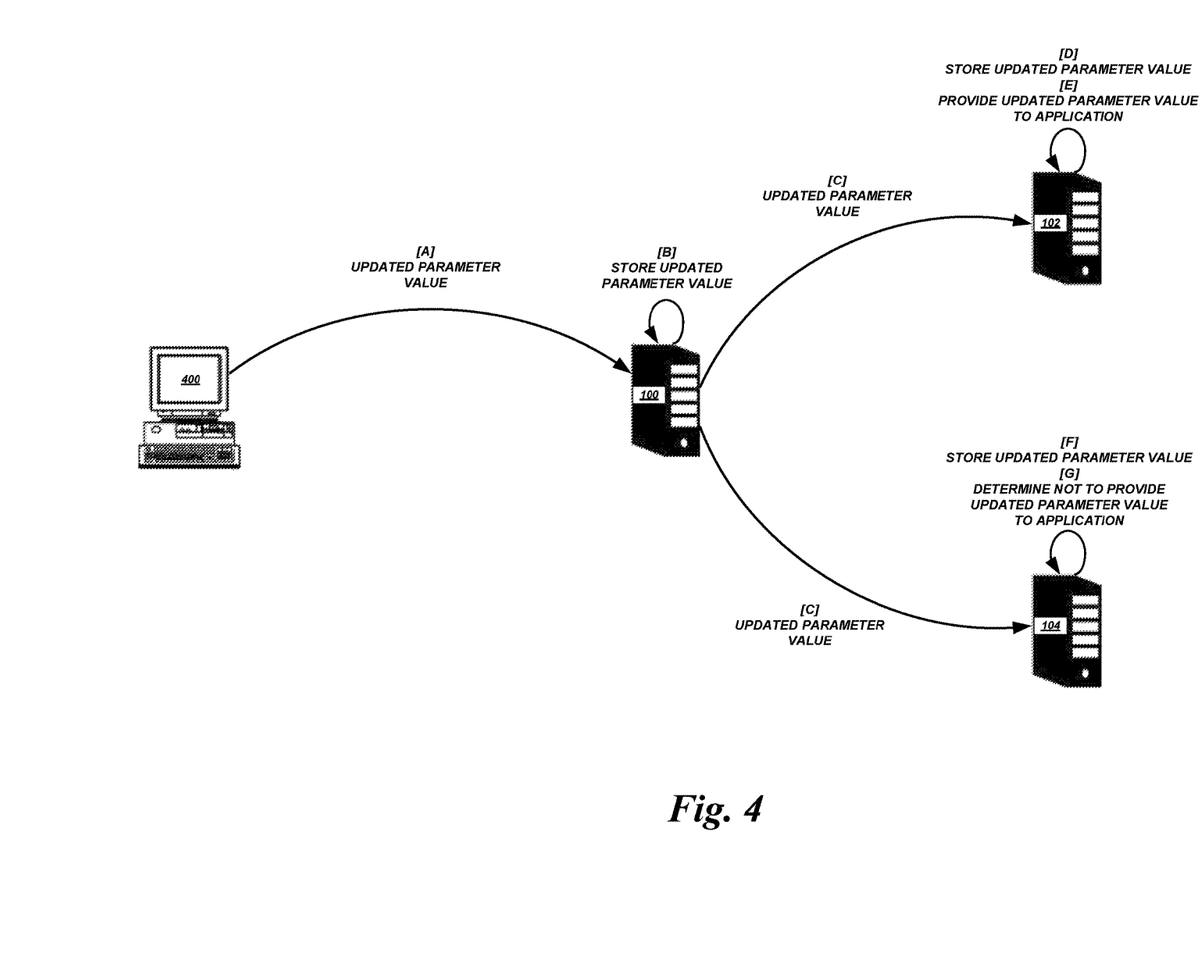
FIG. 4 is a block diagram of various data flows and interactions between the centralized parameter management system and application servers according to some embodiments.

FIG. 4 illustrates the data flows and interactions that may occur during execution of the process 300 according to the example described above. In the illustrated example, the application 220 executing on application server 102 is a phone dialing application, and application 240 executing on application server 104 is a web server application. As shown, a computing device 400 may be used to provide an updated value for a parameter to the centralized parameter management system 100 at [A]. Continuing the example above, the update may be changing the value of the "dialer.callsPerSecond" parameter to "20." The centralized parameter management system 100 may store the update to the parameter at [B]. For example, the parameter value manager 112 may store the updated parameter value in the configuration parameters data store 110.

In some embodiments, the current value for all parameters may be stored on the computing device 400 (or on some other device or in some data store). Such stored values may be referred to as "seed" values. When a parameter value is updated (or in response to some other event, such as on demand, according to a predetermined or dynamically determined schedule, etc.), a process may be initiated to update the corresponding parameter values at the centralized parameter management system 100. For example, each parameter value at the centralized parameter management system 100 may be compared to the corresponding parameter value at the computing device 400. When the values differ, the parameter value at the centralized parameter management system 100 may be updated to the corresponding parameter value from the computing device 400.

The parameter distribution manager 114 or some other module or component of the centralized parameter management system 100 can provide a notification of the parameter update to application servers 102 and 104 at [C].

Application server 102 can store the updated parameter at [D] and provide the parameter to the application 220 for implementation at [E], as described in greater detail above. Application server 104 can store the updated parameter at [F]. However, because the application 240 is not the phone dialer application, the parameter is not applicable to execution of the application 240. Therefore, the application server 104 can determine not to provide the updated parameter value to the application 240 at [G].

In some embodiments, the determination of which parameters are applicable to which applications may be performed by the centralized parameter management system 100, instead of or in combination with being performed by the application servers 102, 104. For example, instead of providing all parameter updates to all application servers 102, 104 which then store the parameters and determine whether to provide them to individual applications, the centralized parameter management system 100 can determine which application servers are executing applications that use the particular configuration parameter whose value has been updated. The centralized parameter management system 100 may then provide the parameter update value to only the determined application server(s).

In some embodiments, the centralized parameter management system 100 does not provide parameter update values directly to application servers. Instead, one or more servers may serve as intermediaries between the centralized parameter management system 100 and the application servers. For example, a cluster of intermediary configuration servers may be implemented to share the load of broadcasting parameter update values to subsets of application servers.

Example Implementations

Figure 5:
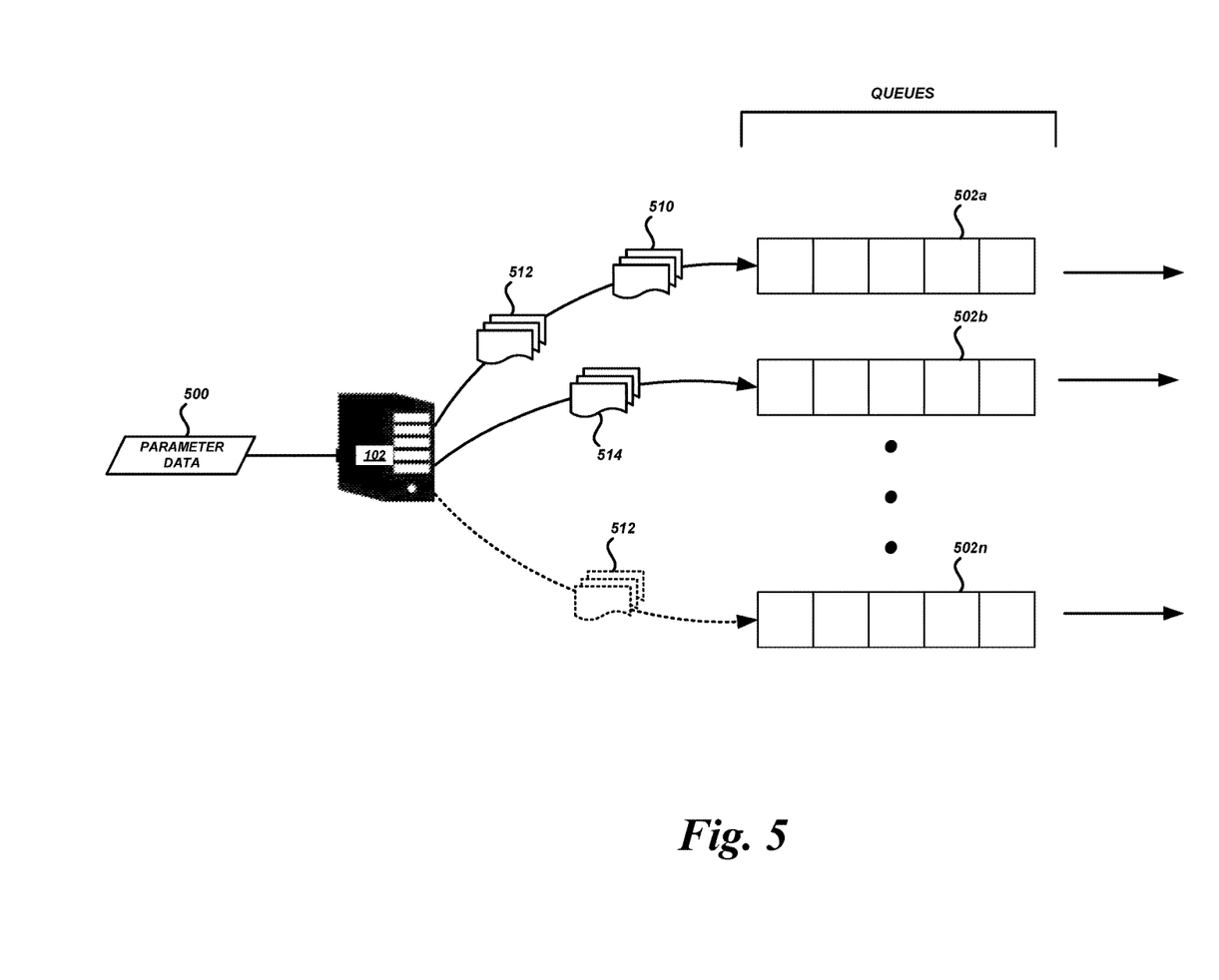
FIG. 5 is a block diagram of various data flows and operations affected by distributed parameter updating according to some embodiments.

FIG. 5 shows an example implementation in which a change to a parameter value maintained by the centralized parameter management system 100 causes a change in the way in which an application server 102 handles the queueing of phone-based communications. In some embodiments, the application server 102 may be configured to send phone-based communications (e.g., phone messages, text messages, multimedia messages, etc.) on behalf of various client accounts. The communications may be queued until computing resources are available to send the communications. For example, the application server 102 may include or be in communication with a number of "worker" processors (e.g., components of the application server—or separate computing devices—that mange transmission of the phone-based communications). The worker processors may monitor a queue, such as queue 502a, for new communications to be sent. When a communication is placed in the empty queue 502a and a worker processor is available, the worker processor sends the communication. If no worker processor is available, the communication remains in the queue 502a until a worker processor is available. Additional communications may also be added to the queue 502a so that a delay in sending of the communications does not hinder generation of the communications by the application server 102. For example, one or more communications 512 on behalf of a second client account may be added to the queue 502a, even though the queue 502a already includes one or more communications 510 generated on behalf of a first client account. The communications 510 and 512 may remain queued, and may then be handled as worker processors become available.

The application server 102a may implement or be in communication with a default queue into which communications are placed when no specific queue is identified. The default queue may be referred to as "queue 0" and labeled 502a in FIG. 5. Configuration parameters may be used to specify or change the queue into which certain communications are placed. Illustratively, the centralized parameter management system 100 may provide parameter data 500 representing a key=value pair for a particular parameter that affects the queuing of communications, such as the key=value pair "action.sending.big.client-1=303." In this example, the key "action.sending.big.client-1" may indicate that communications for the client account identified by the parameter value are to be transmitted using "queue 1," labeled 502b in FIG. 5, rather than the default "queue 0" 502a. The parameter value "303" may be a unique identifier of the client account for which communications are to be placed in "queue 1." Thus, when the application server 102 is to generate communications 514 for a third client account, identified "303," the application server 102 places the communications 514 into "queue 1" 502b. There may be additional worker processors that monitor "queue 1" 502b and send communications that are present there, or the same worker processors may monitor all queues and determine (e.g., using a round-robin or load balancing algorithm) which queues to check next.

During processing of phone-based communication transmissions, it may be observed that a performance metric has satisfied a threshold, and thus a modification to the way in which phone-based communications are processed is to be implemented. In some embodiments, the centralized parameter management system 100, an application server 102, or some other component or device may determine that there is a delay with communications being placed in "queue 0" 502a. For example, the duration of time between placement of a communication in the queue and the time at which the communication is sent may reach some threshold value, or the average duration of time queued for a sample set of communications may reach a threshold value. As another example, the number of communications in the queue at a particular point in time may reach a threshold value. In addition to such delays, it may be observed that a threshold number or percentage of communications being placed in the queue are generated on behalf of a particular client account or subset of client accounts (e.g., client 2, associated with a unique identifier "202"). In response the occurrence of these events (or in response to satisfaction of some other criterion, or on demand, etc.), a parameter value may be set or modified at the centralized parameter management system 100. Illustratively, the parameter key=value pair may be "action.sending.big.client-9=202". In this example, the key "action.sending.big.client-9" indicates that communications for the client account identified by the parameter value are to be transmitted using "queue 9," labeled 502n in FIG. 5, rather than the default "queue 0" 502a. The value "202" is the unique identifier for client 2. The communication application executing on one or more application servers, such as application server 102, may subscribe to parameter updates for all parameters in the group "action.sending." In response to receiving the parameter data 500 from the centralized parameter management system 100, the application server(s) may provide the communication application with the key=value pair for the parameter. The communication application may then alter future execution by placing communications 512 to be sent on behalf of client 2 in "queue 9" 502n, rather than "queue 0" 502a.

Figure 6:
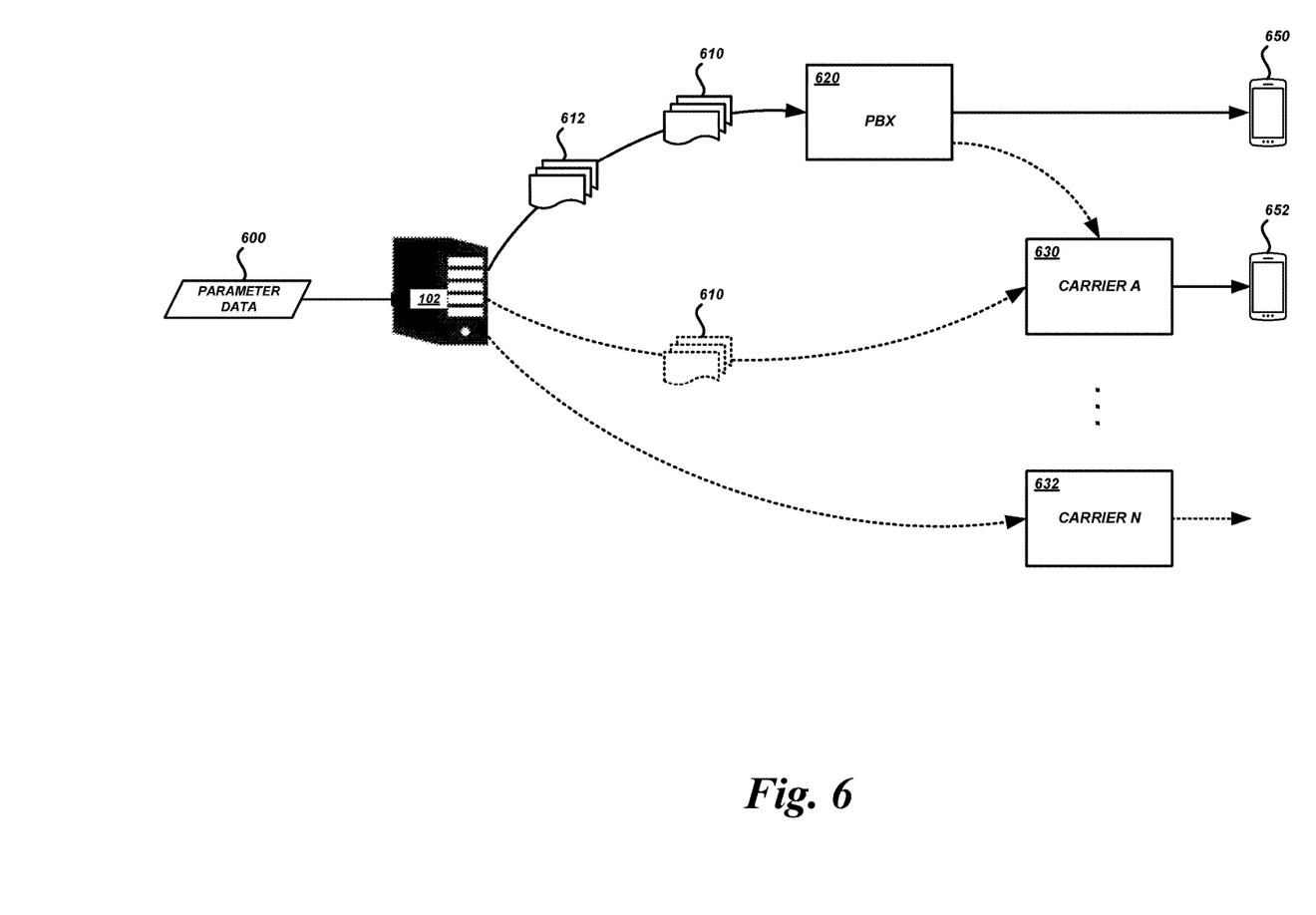
FIG. 6 is another block diagram of various data flows and operations affected by distributed parameter updating according to some embodiments.

FIG. 6 shows an example implementation in which a change to a parameter value maintained by the centralized parameter management system 100 causes a change in the way in which an application server 102 handles the sending of phone-based communications. In some embodiments, the application server 102 may be configured to send phone-based communications (e.g., phone messages, text messages, multimedia messages, etc.) on behalf of various client accounts to various recipients. The phone-based communications may be phone messages that are sent using routing information (e.g., phone numbers) for recipient devices 550 and 552. For example, the application server 102 may send communications to devices 550 and 552 via a private branch exchange ("PBX") that is part of, or otherwise associated with, the system of which the application server 102 is a part. As another example, the application server 102 may send communications to devices via phone carriers that operate as part of (or as a gateway to/from) the public switched telephone network ("PSTN"), such as "carrier A" 630 and "carrier N" 632.

Individual carriers may be associated with different routing information, and/or each device's routing information may be associated with a particular carrier. For example, routing information for a particular recipient device may be a phone number in the format NPA-NXX-XXXX, where "NPA" represents a particular number plan area code, "NXX" represents a particular central office exchange code, and "XXXX" represents a multi-digit number in which any of the digits may be the same or different than any or all of the other digits in the multi-digit number. A particular NPA-NXX sequence may be associated with a particular carrier. Phone-based communications that are sent using a phone number associated with a particular carrier may eventually be routed to the carrier for delivery.

A parameter value may be set or modified at the centralized parameter management system 100 to modify how some phone-based messages are sent (e.g., to ensure more efficient delivery, to reduce costs, etc.). Illustratively, the parameter key=value pair may be "action.sending.carrier-A=123-555". In this example, the key "action.sending.carrier-A" indicates that communications with phone numbers that include the prefix specified by the parameter value ("123-555" in this example) are to be transmitted via "carrier A" 630, rather than via the PBX 620. In response to receiving parameter data 600 from the centralized parameter management system 100 regarding the parameter value, one or more application servers, such as application server 102, may provide the communication application with the key=value pair for the parameter. The communication application may then alter future execution by sending communications 610 to device 652, which has the phone number 123-555-5785, via "carrier A" 630. In this example, communications 612 may continue to be sent to device 650, which has the phone number 456-555-3333, via the PBX 620.

Additional Embodiments

In some embodiments, a parameter value managed by the centralized parameter value system 100 may be a parameter for a version of content to be provided to a requestor or other recipient, such as an end user device. For example, a network content provider may provide network resources (e.g., web pages) to end user devices. There may be different versions of a particular network resource. A parameter may be used to set which version is to be provided at any given time, or which version is to be provided to particular devices or end user accounts, etc.

In some embodiments, a parameter value managed by the centralized parameter value system 100 may be a parameter to control a testing process. For example, a communication application may be tested to determine its ability to handle processing after a variety of phone call outcomes, such as human-answered calls, calls going to voicemail, busy signals, and the like. Rather than actually connecting the phone calls during the text, the communication application may pseudo-randomly identify test calls as having particular outcomes, and then implement processing accordingly.

Configuration parameters may be used to set the percentage of calls to be pseudo-randomly associated with each of the outcomes. Illustratively, there may initially be 39% of calls that are to have human-answered outcomes, 52% of calls that are to have voicemail outcomes, and 9% of calls that are to have other outcomes. The communication application may use a pseudo-random selection process (e.g., based on a "random" number generator) that selects a human-answered outcome 39% of the time, a voicemail outcome 52% of the time, and other outcomes collectively 9% of the time. A configuration parameter may be set to change one or more of these percentages. In response to receiving parameter data from the centralized parameter management system 100 regarding the parameter value, an application server 102 may provide the communication application with the key=value pair for the parameter. The communication application may then alter future execution of the pseudo-random outcome selection process according to the new parameter value.

Terminology

Depending on the embodiment, certain acts, events, or functions of any of the processes or algorithms described herein can be performed in a different sequence, can be added, merged, or left out altogether (e.g., not all described operations or events are necessary for the practice of the algorithm). Moreover, in certain embodiments, operations or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or combinations of electronic hardware and computer software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a general purpose processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor device can be a microprocessor, but in the alternative, the processor device can be a controller, microcontroller, or state machine, combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without other input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list.

Disjunctive language such as the phrase "at least one of X, Y, Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A system comprising:
   a parameter value manager comprising one or more computing devices, wherein the parameter value manager is configured to:
   monitor a performance metric representing performance of processing phone-based communications using a first queue of a plurality of queues;
   determine, based at least partly on the performance metric satisfying a threshold, to modify an application configuration parameter value associated with processing phone-based communications;
   modify the application configuration parameter value to indicate a future phone-based communication associated with a first client account of a plurality of client accounts is to be processed using a second queue of the plurality of queues; and transmit the application configuration parameter value to a plurality of application servers; and an application server comprising one or more computing devices, wherein the application server is configured to:
send a first phone-based communication to the first queue, wherein the first phone-based communication is associated with the first client account;
send a second phone-based communication to the first queue, wherein the second phone-based communication is associated with a second client account of the plurality of client accounts;
receive the application configuration parameter value from the parameter value manager;
determine, based at least partly on the application configuration parameter value, to send a third phone-based communication associated with the first client account to the second queue; and
send a fourth phone-based communication associated with the second client account to the first queue.

2. The system of claim 1, wherein the performance metric represents an amount of time that a phone-based communication is in the first queue.

3. The system of claim 1, wherein the performance metric represents a quantity of phone-based communications in the first queue at a particular time.

4. The system of claim 1, further comprising a second application server comprising one or more computing devices, wherein the second application server is configured to:
receive the application configuration parameter value from the parameter value manager; and
determine not to provide the application configuration parameter value to any application executing on the second application server.

5. A computer-implemented method comprising:
as implemented by a computing system comprising one or more computer processors configured to execute specific instructions,
receiving a plurality of application configuration parameter values from a parameter management system;
determining that a first application configuration parameter value of the plurality of application configuration parameter values is to be used by an application on the computing system;
determining that a second application configuration parameter value of the plurality of application configuration parameter values is not to be used by the application;
providing the first application configuration parameter value to the application;
receiving, from the parameter management system, an update to the first application configuration parameter value and an update to the second application configuration parameter value; and
providing the update to the first application configuration parameter value to the application, wherein the update to the second application configuration parameter value is not provided to the application.

6. The computer-implemented method of claim 5, further comprising determining not to provide the second application configuration parameter value to the application based at least partly on the determining that the second application configuration parameter value is not to be used by the application.

7. The computer-implemented method of claim 5, further comprising determining, by the application, a logical branch to execute based at least partly on the update to the first application configuration parameter value.

8. The computer-implemented method of claim 5, further comprising determining, by the application, a number of operations to perform based at least partly on the value of an application configuration parameter.

9. The computer-implemented method of claim 5, further comprising:
transmitting a first phone-based communication to a recipient device via a private branch exchange prior to receiving the update to the first application configuration parameter value, wherein the recipient device is associated with first routing information; and
transmitting a second phone-based communication to the recipient device via a carrier connection, without using the private branch exchange, based at least partly on the update to the first application configuration parameter value, wherein the update to the first application configuration parameter value indicates that phone-based communications associated with the first routing information are to be transmitted via the carrier connection.

10. The computer-implemented method of claim 9, further comprising:
transmitting a third phone-based communication to a second recipient device via the private branch exchange prior to receiving the update to the first application configuration parameter value, wherein the second recipient device is associated with second routing information; and
transmitting a fourth phone-based communication to the recipient device via the private branch exchange subsequent to receiving the update to the first application configuration parameter value.

11. The computer-implemented method of claim 5, further comprising:
storing a first phone-based communication in a default queue prior to receiving the update to the first application configuration parameter value, wherein the first phone-based communication is to be sent on behalf of a first client account of a plurality of client accounts; and
storing a second phone-based communication in a second queue based at least partly on the update to the first application configuration parameter value, wherein the second phone-based communication is to be sent on behalf of the first client account.

12. The computer-implemented method of claim 11, further comprising:
storing a third phone-based communication in the default queue prior to receiving the update to the first application configuration parameter value, wherein the third phone-based communication is to be sent on behalf of a second client account of the plurality of client accounts; and
storing a fourth phone-based communication in the default queue subsequent to receiving the update to the first application configuration parameter value, wherein the fourth phone-based communication is to be sent on behalf of the second client account.

13. The computer-implemented method of claim 11, further comprising generating a performance metric representing performance of processing phone-based communications, wherein the performance metric comprises at least one of: a measurement of time that a phone-based communication is in the default queue, or a quantity of phone-based communications in the default queue at a particular point in time.

14. A system comprising:
computer-readable memory storing computer-executable instructions; and
one or more computer processors in communication with the computer-readable memory and programmed by the computer-executable instructions to at least:
receive a plurality of application configuration parameter values from a parameter management system;
determine that a first application configuration parameter value of the plurality of application configuration parameter values is to be used by an application;
determine that a second application configuration parameter value of the plurality of application configuration parameter values is not to be used by the application;
provide the first application configuration parameter value to the application;
receive, from the parameter management system, an update to the first application configuration parameter value and an update to the second application configuration parameter value; and
provide the update to the first application configuration parameter value to the application, wherein the update to the second application configuration parameter value is not provided to the application.

15. The system of claim 14, wherein the one or more computing devices are further programmed by the executable instructions to:
execute the application; and
determine, by the application, a logical branch to execute based at least partly on the update to the first application configuration parameter value.

16. The system of claim 14, wherein the one or more computing devices are further programmed by the executable instructions to:
execute the application; and
determine, by the application, a number of operations to perform based at least partly on the on the value of an application configuration parameter.

17. The system of claim 14, wherein the one or more computing devices are further programmed by the executable instructions to:
transmit a first phone-based communication to a recipient device via a private branch exchange prior to receiving the update to the first application configuration parameter value, wherein the recipient device is associated with first routing information; and
transmit a second phone-based communication to the recipient device via a carrier connection, without using the private branch exchange, based at least partly on the update to the first application configuration parameter value, wherein the update to the first application configuration parameter value indicates that phone-based communications associated with the first routing information are to be transmitted via the carrier connection.

18. The system of claim 14, wherein the one or more computing devices are further programmed by the executable instructions to:
store a first phone-based communication in a default queue prior to receiving the update to the first application configuration parameter value, wherein the first phone-based communication is to be sent on behalf of a first client account of a plurality of client accounts; and
store a second phone-based communication in a second queue based at least partly on the update to the first application configuration parameter value, wherein the second phone-based communication is to be sent on behalf of the first client account.

19. The system of claim 14, wherein the one or more computing devices are further programmed by the executable instructions to:
select a first version of a network resource to provide to a recipient device prior to receiving the update to the first application configuration parameter value; and
select a second version of the network resource to provide to the recipient device based at least partly on the update to the first application configuration parameter value.

20. The system of claim 14, wherein the one or more computing devices are further programmed by the executable instructions to:
determine, using a pseudo-random selection process, a first testing outcome for an amount of test operations prior to receiving the update to the first application configuration parameter value; and
determine, using the pseudo-random selection process, a second testing outcome for the amount of test operations based at least partly on the update to the first application configuration parameter value.

* * * * *